US012650246B2

(12) United States Patent　　　(10) Patent No.:　US 12,650,246 B2
Schletter　　　　　　　　　　　　(45) Date of Patent:　　　Jun. 9, 2026

(54) PILE-DRIVING PROFILE

(71) Applicant: SL RACK GMBH, Haag (DE)

(72) Inventor: Ludwig Schletter, Haag i. OB (DE)

(73) Assignee: SL RACK GMBH, Haag (DK)

( * ) Notice: Subject to any disclaimer, the term of this patent is extended or adjusted under 35 U.S.C. 154(b) by 92 days.

(21) Appl. No.: 18/730,078

(22) PCT Filed: Feb. 1, 2023

(86) PCT No.: PCT/EP2023/052474
　　　§ 371 (c)(1),
　　　(2) Date: Jul. 18, 2024

(87) PCT Pub. No.: WO2023/152006
　　　PCT Pub. Date: Aug. 17, 2023

(65) Prior Publication Data
　　　US 2025/0116428 A1　　Apr. 10, 2025

(30) Foreign Application Priority Data
　　　Feb. 10, 2022　(DE) ..................... 10 2022 103 126.8

(51) Int. Cl.
　　　*F24S 25/61*　　　(2018.01)
　　　*E02D 7/14*　　　(2006.01)
　　　*F24S 25/617*　　　(2018.01)
　　　*H02S 20/10*　　　(2014.01)
　　　*F24S 25/00*　　　(2018.01)
(52) U.S. Cl.
　　　CPC .............. *F24S 25/617* (2018.05); *E02D 7/14* (2013.01); *H02S 20/10* (2014.12); *F24S 2025/013* (2018.05)
(58) Field of Classification Search
　　　CPC . F24S 25/617; F24S 2025/0013; H02S 20/10; E02D 7/14

USPC .......................................................... 405/279
See application file for complete search history.

(56) References Cited

U.S. PATENT DOCUMENTS

| | | | | |
|---|---|---|---|---|
| 1,770,652 | A | * | 7/1930 | Meiser ...................... E02D 5/04 |
| | | | | 405/277 |
| 5,902,074 | A | * | 5/1999 | Berkley .................... E02D 5/03 |
| | | | | 405/274 |
| 2016/0024739 | A1 | | 1/2016 | Kelleher |

FOREIGN PATENT DOCUMENTS

| | | | |
|---|---|---|---|
| DE | 2 037 054 | A1 | 2/1972 |
| DE | 86 01 652 | U1 | 4/1986 |
| DE | 103 33 334 | A1 | 3/2004 |
| DE | 202005008159 | U1 | 9/2005 |
| DE | 202008015017 | U1 | 1/2009 |
| DE | 102009054250 | A1 | 5/2011 |
| DE | 102012205405 | A1 | 11/2012 |
| DE | 202014102505 | U1 | 9/2015 |
| DE | 102015004046 | A1 | 10/2016 |

(Continued)

OTHER PUBLICATIONS

European Patent Office, Examination Report issued on Nov. 27, 2025 in related European Patent Application No. 23 703 051.5, 6 pages.

*Primary Examiner* — Kyle Armstrong
(74) *Attorney, Agent, or Firm* — J. Peter Paredes; Amin Wasserman Gurnani LLP

(57)　　　　ABSTRACT

The invention relates to a pile-driving profile, preferably for an outdoor solar installation, comprising a main body and two limbs extending from the main body, wherein the limb ends are each bent inwards and form a stack stop for stacking with a further pile-driving profile.

7 Claims, 2 Drawing Sheets

(56)          References Cited

FOREIGN PATENT DOCUMENTS

| EP | 1 661 451 A1 | 5/2006 |
|----|----|----|
| FR | 760 122 A | 2/1934 |
| FR | 2 437 157 A1 | 4/1980 |
| FR | 2 811 695 A1 | 1/2002 |

* cited by examiner

Figure 1:
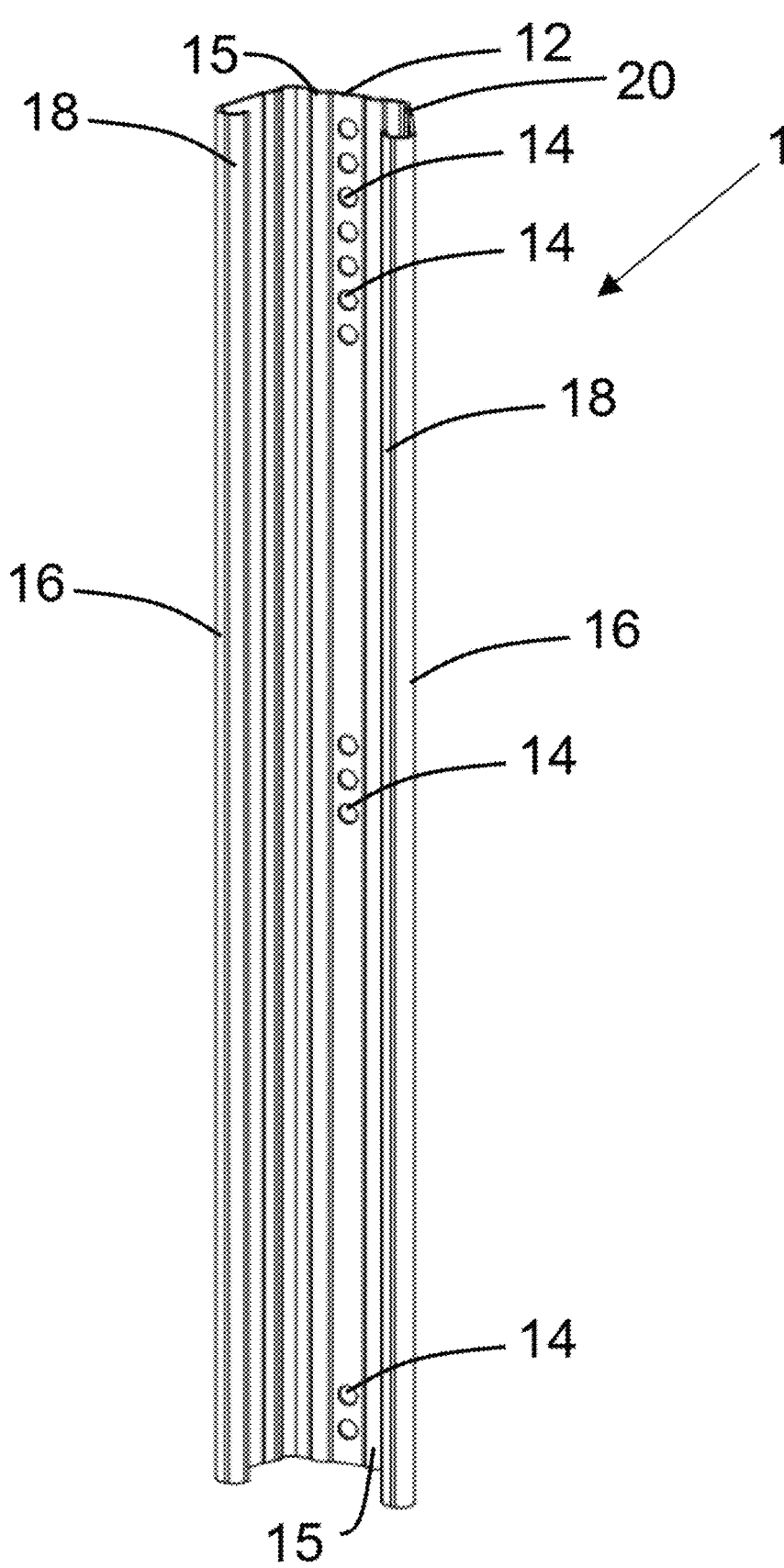

<u>Fig. 1</u>

PILE-DRIVING PROFILE

CROSS-REFERENCE TO RELATED APPLICATIONS

The present application claims priority to PCT application serial no. PCT/EP2023/052474 filed Feb. 1, 2023, which claims priority from German patent application serial no 102022103126.8, filed Feb. 10, 2022, each herein incorporated by reference in their entireties.

The invention relates to a pile-driving profile, preferably for a free-field solar installation.

In free-field solar installations, the solar panels are mounted on a substructure. Here, the substructure often comprises pile-driving profiles to be driven into a ground.

So far, it has been possible to staple pile-driving profiles only mirror-imaged wise, if it all. Consequently, they must be removed, and rotated, manually to be assembled, making this process mechanically demanding and time-consuming.

Thus, it is an object of the invention to create a pile-driving profile and a method allowing for an automated assembly.

This object is achieved by the subject matters as well as the method of the independent claims.

According to the invention, the pile-driving profile may preferably be used, and/or configured, as part of a substructure of a free-field solar installation.

For example, the pile-driving profile may be driven into the ground to ensure a secure footing.

The pile-driving profile comprises a main body and two limbs extending from the main body.

Preferably, the main body and/or the limbs are configured flat and/or plate-like.

For example, the main body and/or the limbs comprise a metal material or consist thereof.

The length of the pile-driving profile, preferably of the main body and/or the limbs, may range between 2.5 m and 4.5 m.

Preferably, the limbs extend to the same side relative to the main body.

For example, the limbs may be configured to be axisymmetric.

For example, the limbs may be arranged at the main body in U or V shape.

Preferably, the main body and the limbs are configured in one piece. Thus, production costs can be reduced.

The limb ends which preferably oppose the main body or are facing away from the main body, respectively, are each bent inwards and form a stack stop for stacking with a further pile-driving profile.

Preferably, the further pile-driving profile is identical in construction.

For example, the limb ends may be round or beveled.

The stack stops allow for multiple pile-driving profiles to be stack one above the other, e.g., into magazines.

Thanks to the inwards bent limb ends, the stack stops ensure that the main bodies of different pile-driving profiles are spaced apart, e.g.

Thus, the pile-driving profiles can be removed one after the other automatically, e.g., using a gripper. Consequently, this allows for the pile-driving profiles to be assembled in an automated manner.

Further embodiments of the invention are shown in the dependent claims, the specification as well as the drawings enclosed.

According to one embodiment, the limbs each comprise an indentation as mating stop for a stack stop of a further pile-driving profile.

For example, the indentations may be round or angular.

Preferably, the indentations may extend across the entire length of the pile-driving profile.

For example, the indentations may be oriented in parallel with each other.

In a sense, the indentations define the stop positions of the stack stops.

Further, they provide for a certain footing such that the stacked pile-driving profiles will not unintentionally be detached from each other when in a transporting position.

According to another embodiment, the limbs are angled outwards relative to the main body.

Thanks to the limbs being angled outwards, the pile-driving profiles may be stacked into each other.

A pile-driving profile can at least partially be grabbed from the pile-driving profile below.

According to another embodiment, a limb, preferably both limbs, forms an angle of between 90° and 140° with the main body.

Preferably, the angle may range between 100° and 130°, e.g., be 115°.

For example, the angle may be more than 90°.

According to another embodiment, the main body comprises at least one inwards oriented bead.

For example, the bead may be round or angled.

Preferably, the bead may extend across the entire length of the pile-driving profile.

Preferably, two or more beads are provided, e.g. oriented in parallel.

The bead improves stability of the pile-driving profile. Thus, the pile-driving profile will not be deformed while being driven into the ground.

For example, the main body may comprise recesses for mounting binders. Preferably, the recesses are provided centrally at the main body.

With two beads being provided, the recesses may be arranged between the beads.

Thanks to the beads being oriented inwards, they do not interfere with mounting of the binders.

Further, the invention relates to a system with at least two pile-driving profiles according to the invention.

The pile-driving profiles are configured to be stackable, or stacked, when in a transporting position.

Preferably, they are stackable, or stacked, in a way that the main bodies of two pile-driving profiles stacked one above the other will be spaced from each other, thus allowing for an automated removal.

Preferably, the pile-driving profiles are oriented in the same manner. For example, the main bodies of the pile-driving profiles may be oriented downwards.

Multiple pile-driving profiles stacked one above the other may each form a magazine.

Finally, the invention relates to a method of automated assembly of preferably inventive pile-driving profiles.

In a horizontal transporting position, at least one first pile-driving profile will be, or is, stacked above a second pile-driving profile. For example, the pile-driving profiles may be, or are, stacked into magazines.

For example, the pile-driving profiles, or the magazines, may be placed on a vehicle, e.g. a wheel loader.

For example, also pile-driving profiles, or magazines, of different sizes may be provided.

Preferably, all pile-driving profiles are oriented in the same manner. For example, the main bodies of the pile-driving profiles may be oriented downwards.

The first pile-driving profile is placed into a vertical driving position, preferably by a gripper.

For example, a gripper can remove the top pile-driving profile of a magazine and rotate it by 90°.

According to one embodiment, the first pile-driving profile is driven into the ground using a drive head.

Preferably, in doing so, the pile-driving profile may be held by the gripper.

According to another embodiment, the second pile-driving profile is placed into a vertical driving position, preferably by a gripper.

The pile-driving profiles can be removed one after the other and be erected.

According to another embodiment, the second pile-driving profile is driven into the ground using a drive head.

The pile-driving profiles may be driven into the ground one after the other.

Accordingly, the same process may be followed for a third, a fourth, a fifth pile-driving profile and so on.

Thus, the inventive method allows for the pile-driving profiles to be assembled in an automated manner.

Preferably, all embodiments and components of devices as described here are configured to be assembled with the method described here. Further, all embodiments of the devices described here and all embodiments of the method described here can each be combined with each other, preferably also without being bound to the specific configuration in the context of which they are mentioned.

Figure 2:
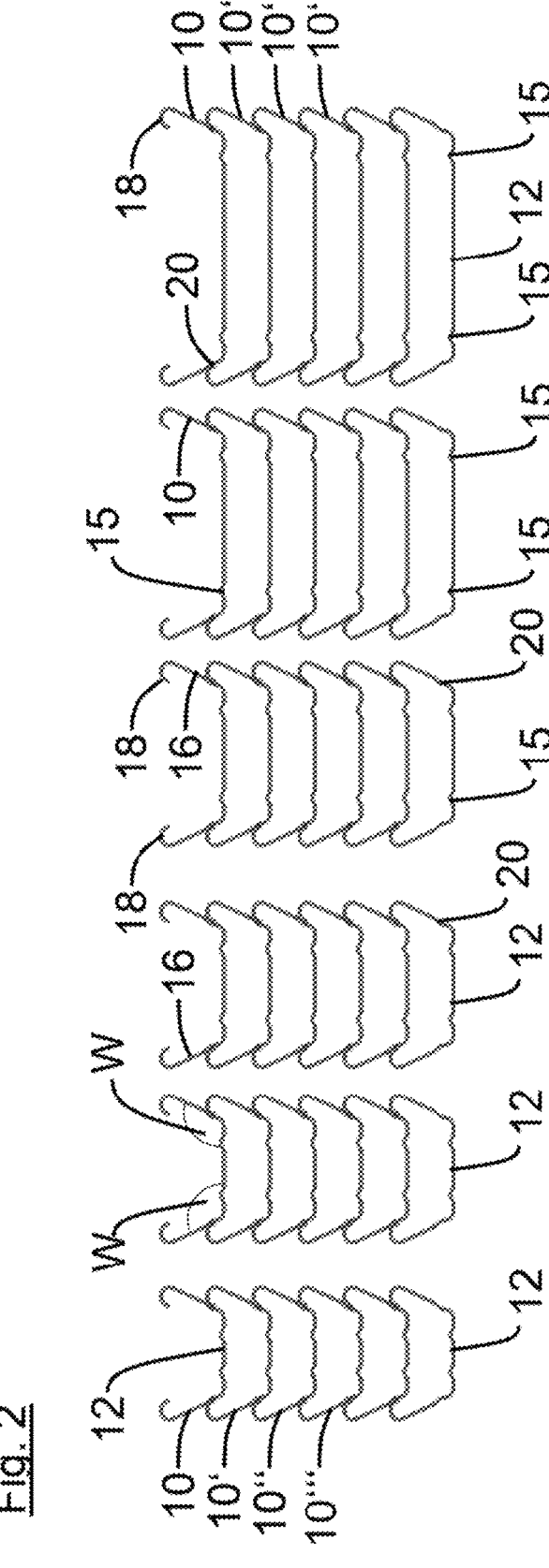

In the following, the invention will be described by way of example with reference to the drawings. In the drawings, FIG. 1 shows a perspective view of one embodiment of a pile-driving profile according to the invention, and FIG. 2 shows a side view of one embodiment of multiple stacked pile-driving profiles according to the invention.

Firstly, it shall be noted that the embodiments illustrated are exemplary only. Thus, individual features may be implemented not only in the combination shown but also alone as itself or in other technically feasible combinations. For example, the features of one embodiment may be combined arbitrarily with features of another embodiment. Preferably, the number and/or the position of the beads and/or recesses may vary. Further, more or fewer pile-driving profiles may be provided.

When a figure includes a reference sign which is not explained in the directly associated text of the specification, reference will be made to the corresponding previous or following explanations made in the description of the figures. Thus, same reference signs will be used for same, or comparable, components in the figures, and they will not be explained once again.

FIG. 1 shows a pile-driving profile 10' with a main body 12. The main body 12 comprises central recesses 14 to which, e.g., binders (not shown) can be mounted.

Additionally, the main body 12 comprises two beads 15 oriented in parallel with each other. The beads 15 improve stability of the pile-driving profile 10'.

Further, the pile-driving profile 10' comprises limbs 16 extending from the main body 12.

The limb ends 18 are each bent inwards and form a stack stop for stacking with a further pile-driving profile.

To make stacking easier, the limbs 16 may each comprise indentations 20. The indentations 20 may extend across the entire length of the pile-driving profile 10', as do the sicks 15.

FIG. 2 shows multiple stacked pile-driving profiles 10, 10', 10", 10'" of different sizes. A first pile-driving profile 10 is each stacked on a second pile-driving profile 10'. In turn, the second pile-driving profile 10' is stacked on a third pile-driving profile 10", which, in turn, is stacked on a fourth pile-driving profile 10'" and so on.

The limb ends 18 of the fourth pile-driving profile 10'" engage with the indentations 20 of the third pile-driving profile 10". In turn, the limb ends 18 of the third pile-driving profile 10" engage with the indentations 20 of the second pile-driving profile 10' and the limb ends 18 of the second pile-driving profile 10' with the indentations 20 of the first pile-driving profile 10.

The limbs 16 form an obtuse angle W with the main body 12. Thus, the pile-driving profiles 10, 10', 10", 10'" can be stacked at least partially into each other.

Pile-driving profiles 10, 10', 10", 10'" arranged one above the other each rest on the inwards bent limb ends 18.

Consequently, the main bodies 12 as well as the limbs 16 of the pile-driving profiles 10, 10', 10", 10'" are spaced from each other such that they may be grabbed in an automated manner, e.g. using a gripper.

LIST OF REFERENCE SIGNS 10, 10', 10", 10'" pile-driving profile
12 main body
14 recess
15 bead
16 limb
18 limb end
20 indentation
W angle

The invention claimed is:

1. A pile-driving profile (10') for a free-field solar installation,
comprising
a main body (12), and
two limbs (16) extending from said main body (12), wherein the limb ends (18) are each bent inwards and form a stack stop for stacking with a further pile-driving profile (10),
wherein
said limbs (16) are angled outwards relative to said main body (12),
and wherein
said limbs each comprise an indentation (20) serving as mating stop for a stack stop of a further pile-driving profile (10").

2. Said pile-driving profile (10') according to claim 1, wherein
a limb (16) forms an angle (W) of between 90° and 140° with said main body (12).

3. Said pile-driving profile (10') according to claim 1, wherein
said main body (12) comprises at least one inwards bent bead (15).

4. A system with at least two pile-driving poles (10, 10', 10", 10'") according to claim 1, wherein said pile-driving poles (10, 10', 10", 10'") are configured to be stackable, or stacked, in a transporting position.

5. A method of automated assembly of pile-driving poles (10, 10', 10", 10'") according to claim 1, wherein in a horizontal transporting position, at least a first pile-driving profile (10) will be, or is, stacked on a second pile-driving profile (10'), and said first pile-driving profile (10) is placed into a vertical driving position.

6. Said method according to claim 5, wherein said first pile-driving profile (10) is driven into a ground using a drive head.

7. Said method according to claim 5, wherein said second pile-driving profile (10') is placed into a vertical driving position and driven into a ground using a drive head.

* * * * *